United States Patent
Hyde

[15] 3,644,264
[45] Feb. 22, 1972

[54] N-ALKYL PYRROLIDONE-PLASTICIZED COPOLYLACTAM COMPOSITIONS

[72] Inventor: Thomas J. Hyde, Woodbury, N.J.
[73] Assignee: E. I. du Pont de Nemours and Company, Wilmington, Del.
[22] Filed: Aug. 1, 1969
[21] Appl. No.: 846,974

Related U.S. Application Data

[63] Continuation-in-part of Ser. No. 710,771, Mar. 6, 1968, abandoned.

[52] U.S. Cl. ...................................260/30.2 R, 260/78 L
[51] Int. Cl. ...............................................C08g 51/44
[58] Field of Search .........................260/30.2, 78 L

[56] References Cited

UNITED STATES PATENTS

| | | | |
|---|---|---|---|
| 3,156,750 | 11/1964 | Cuculo | 264/178 |
| 3,216,976 | 11/1965 | Schwartz | 260/78 |
| 3,451,963 | 6/1969 | Tierney et al. | 260/37 |

Primary Examiner—Morris Liebman
Assistant Examiner—Richard Zaitlen
Attorney—James J. Flynn

[57] ABSTRACT

Polymerizable lactam compositions comprising an anionic catalyst, a polymerization promoter, 50 to 90 percent of caprolactam, at least 1 percent of a lactam having seven to 12 carbon atoms in the lactam ring, and 2 to 20 percent of the plasticizer N-alkyl pyrrolidone, and the manufacture of impact-resistant articles by casting and anionically polymerizing the mixture.

14 Claims, No Drawings

N-ALKYL PYRROLIDONE-PLASTICIZED COPOLYLACTAM COMPOSITIONS

CROSS-REFERENCE TO RELATED APPLICATION

This application is a continuation-in-part of application Ser. No. 710,771, filed Mar. 6, 1968, now abandoned.

BACKGROUND OF THE INVENTION

The polymerization of lactams to polylactams has been known for many years. The earliest processes for this polymerization were slow and involved the use of water or acidic reagents as polymerization catalysts. Subsequent work showed that base-catalyzed, i.e., anionic, polymerization of lactams, for example, caprolactam, or mixtures thereof can be made especially fast by the addition of certain compounds that function as polymerization promoters, i.e., cocatalysts. Particularly effective polymerization promoters for the anionic polymerization of lactams are, for example, acylating agents such as acyl halides or anhydrides and isocyanates. Although the promoted anionic polymerization process is rapid, the resulting polylactam articles are not especially resistant to damage by impact. Therefore, it has been necessary to plasticize these compositions in order to reduce brittleness and increase impact strength. The sulfonamides, e.g., Santicizer 8, used to plasticize 66 nylon and 6 nylon polymer, cannot be used in lactam mixtures which are to be anionically polymerized because active hydrogens on the mixed N-monoalkyl sulfonamides interfere with polymerization. Plasticization can be achieved by mixing plasticizers with the polyamide, and sometimes is accomplished by boiling the polylactam in water, or by exposing the article to air at ambient relative humidity. These plasticizing procedures are very time consuming, and usually if water is employed as a plasticizer only the outer surface of the polylactam is plasticized because of the low rate of diffusion of the water into the polylactam. Furthermore, water-plasticization is undependable because water is a fugitive plasticizer, e.g., under conditions of low relative humidity. Therefore, a need exists for better plasticized polylactam articles that are unusually resistant to damage by impact and that can be made, especially in massive forms, by a convenient and rapid process, e.g., the process of casting and anionically polymerizing plasticizer-containing monomeric lactam compositions.

SUMMARY OF THE INVENTION

It has been discovered that compositions comprising an anionic catalyst, a polymerization promoter, and, by weight of the total composition, (a) about from 50 percent, preferably 65 percent, to 90 percent caprolactam, (b) at least 1 percent of a lactam having seven to 12 carbon atoms in the lactam ring, and (c) about from 2 to 20 percent of the plasticizer N-alkyl pyrrolidone, are cast and polymerized into articles that have outstanding resistance to damage by impact. The polymerizable lactam composition can be cast and polymerized in any form but, due to its impact resistance, is especially useful when cast and polymerized in the form of bowling pins or floor tiles.

These cast articles of high impact-resistant plasticized copolylactam compositions are prepared by anionically polymerizing in a mold a mixture of lactams below the melting point of the resulting polylactam, said mixture containing an anionic catalyst, i.e., a lactam-base salt; a polymerization promoter, i.e., a cocatalyst; and by weight of the total composition about from 50 percent, preferably 65 percent, to 90 percent caprolactam; at least 1 percent, preferably not more than 15 percent, and generally not more than about 30 percent of a monomeric lactam having from seven to 12 carbon atoms in the lactam ring, in the presence of about from 2 to 20 percent N-alkyl pyrrolidone. Generally not more than 15 percent monomeric lactam containing seven to 12 carbon atoms is used because of the cost of monomer, and time in mold is substantially increased with larger amounts, thus it is commercially unattractive. The resulting impact resistant plasticized copolylactam composition contains, by weight, about from 50 percent, preferably 65 percent, to 90 percent caprolactam moieties, at least 1 percent, but preferably not more than 15 percent, and generally not more than 30 percent of lactam moieties containing seven to 12 carbon atoms, and about from 2 to 20 percent, and preferably less than 15 percent, of the plasticizer N-alkyl pyrrolidone. Laurolactam and caprylolactam moieties in combination with caprolactam moieties are the preferred lactam components of the plasticized copolylactam composition. Unplasticized polylactam or polylactam plasticized by known means is not well suited to fabrication into relatively massive products that have sufficient impact strength to be used as bowling pins, as can the plasticized copolylactam compositions of this invention.

PREFERRED EMBODIMENTS

The polymerizable lactam composition must contain a mixture of lactams including about from 50 percent, preferably 65 percent, to 90 percent caprolactam and at least 1 percent of a lactam having seven to 12 carbon atoms in the lactam ring; such seven to 12 carbon atom lactams include, for example, enantholactam, caprylolactam, laurolactam and mixtures thereof. Generally not more than 30 percent and preferably not more than 15 percent of the monomeric lactam having seven to 12 carbon atoms is used. Best results, i.e., for high impact resistance, are obtained when the lactam mixed with caprolactam to be polymerized is caprylolactam or laurolactam.

The plasticizer used in the lactam composition is N-alkyl pyrrolidone. Generally, the alkyl substituent is a lower alkyl group and usually contains one to four carbon atoms, and most preferably is methyl or ethyl. The amount of plasticizer in the polymerizable lactam composition is from about 2 to 20 percent, by weight, of the total composition and generally 5 to 15 percent.

The process used for polymerizing the lactam mixture containing plasticizer employs a promoted anionic polymerization technique. This polymerization involves heating in a mold the polymerizable lactam composition containing about from 50 percent, preferably 65 percent, to 90 percent caprolactam; at least 1 percent of a lactam having seven to 12 carbon atoms in the lactam ring; about from 2 to 20 percent of the N-alkyl pyrrolidone plasticizer; anionic catalyst and polymerization promoter at a temperature above the melting point of the lactam monomer but below the melting point of the resulting polylactam.

Generally, the lactam to be polymerized is the same as that used for the preparation of the anionic catalyst although other lactams, preferably having six to 12 carbon atoms in the lactam ring, can be employed to form the anionic catalyst.

The base employed to form the anionic catalyst can be, for example, an alkali metal, an alkaline earth metal, or a basic derivative of one of these metals such as hydroxide, hydride, amide or a Grignard reagent.

The anionic catalyst or lactam-base salt is prepared by heating a lactam with a base at a temperature between about 25° to 225° C. The base can be added to the total lactam which is to be polymerized or to a portion of the lactam, and said lactam after formation of the anionic catalyst can be added to additional lactam. Preferably, the lactam and base should be substantially anhydrous, and the amount of base charged should be from about 0.1 to 10 mole percent based on the total lactam used in preparing the anionic catalyst and the related polymerizable composition.

The polymerization promoter or cocatalyst can be, for example, an acyl halide, anhydride, or imide; an organic isocyanate; a ketene; or a substituted urea or mixtures of these. These polymerization promoters are well known in the art, and representative examples are described in U.S. Pat. Nos. 3,316,221 and 3,236,789. The promoters are employed in proportions varying from about 0.05 to 5 mole percent of the total lactam. The polymerization promoter can be added to a portion of the lactam containing the anionic catalyst or it can be dissolved in a separate portion of the lactam and this portion subsequently mixed in the mold with the other portion containing the anionic catalyst.

The polymerizable lactam composition is polymerized under substantially anhydrous conditions at a temperature above the melting point of the monomers and below the melting point of the resulting polymer. Under most conditions, the temperature during polymerization is between about 100° and 200° C., and most preferably is within the range of 150° to 175° C.

A preferred embodiment of this invention is conducted by mixing ε-caprolactam and a higher lactam having seven to 12 carbon atoms in the lactam ring, e.g., laurolactam, in a vessel and heating the lactam mixture until it is melted. Sodium hydride in hydrocarbon oil is added to the resulting molten lactam. This mixture, at a temperature of about 80° to 90° C., is sparged with dry nitrogen until the sodium hydride has reacted with the lactam to form the anionic catalyst, i.e., lactam-base salt, and byproduct hydrogen is swept out of the reactor. In a second vessel, a mixture of caprolactam and, for example, ω-laurolactam is combined with the plasticizer N-alkyl pyrrolidone and a polymerization promoter. Optionally, a thickening agent, pigment, blowing agent or mold release agent can be added to the lactam. In any event, the two lactam mixtures containing, respectively, anionic catalyst, and promoter and plasticizer, are mixed. The resulting polymerizable lactam composition containing anionic catalyst, polymerization promoter, caprolactam, laurolactam and plasticizer is cast into the mold and immediately thereafter polymerized into a predetermined shape at a temperature above the melting point of the monomer mixture but below the melting point of the resulting polylactam. Polymerization to a solid cast article occurs within a short time, depending upon the particular polymerization temperature and activity of the catalyst and cocatalyst employed, and usually is within 10 minutes. Alternatively, the anionic catalyst, promoter and plasticizer can be added to a single quantity of a mixture of caprolactam and higher carbon containing lactam, e.g., caprylolactam, at a lower temperature and placed in a heated mold cavity for forming to a predetermined shape.

If desired, the polymerization reaction can be conducted in the presence of up to about 5 percent of one or more of various pigments, fillers, mold release agents and thickening agents. Finely divided fillers can be suspended in the polymerizable lactam composition which also can contain colorants and antioxidants. Thickening agents such as soluble linear polyamide resins, for example, nylon-11, nylon-12 and terpolymers of nylon-6, 66 and 6-10 (Zytel 63) can be added to the polymerizable lactam composition in order to increase its viscosity so that pigment will remain suspended and more uniformly distributed throughout the polymerizable composition. Foaming agents can be added to the polymerizable lactam composition if foamed articles are desired. The blowing agents can be gases, liquids and solids which are soluble in the lactam composition and are volatilized at higher temperatures generated during polymerization, for example, benzene, heptane or propane. Other representative foaming agents can be chemical blowing agents such as allylic azides and diazirines. Mold release agents or compounds that produce a better foam structure such as alkali metal stearates can be included in the polymerizable lactam composition.

The following examples illustrate the invention in detail.

EXAMPLE 1 ε-caprylolactam,

Into a narrow mouth glass vessel 1 are charged 226 g. of substantially anhydrous ε-caprolactam, 1.5 g. of sodium hydride dispersed in 1.5 g. of hydrocarbon oil, and 8.8 g. of potassium stearate. Into a similar vessel 2 are charged 94 g. of ⅓-caprolactam, 132 g. of ω-caprololactam, and 4.0 g. of poly(diphenylolpropane carbonate), i.e., Lexan-105, as polymerization promoter. The contents of both vessels are melted by placing the vessels in an oil bath held at 150° C. and then sparged with dry nitrogen gas for 10 minutes. Then 80 g. of N-methyl-2-pyrrolidone is added to and mixed with the contents of vessel 2. The contents of the two vessels are mixed to form a polymerizable lactam composition, and this composition is poured into a metal mold having an internal cavity 10 inches × 10 inches ×3/8 inch and preheated to a temperature of about 150° C. The filled mold is supported in a vertical position in a steam-heated press held at 150° C. and thus polymerization is conducted above the melting point of the monomer mixture but below the melting point of the resulting polylactam. After about 5 minutes, the mold is removed from the press, the resulting cast block of plasticized polylactam is removed from the mold, and allowed to stand for at least 24 hours at room temperature, e.g., about 25° C., before being impact tested as described below.

The process described above is repeated with the exception that vessel 2 contains 226 g. of ε-caprolactam, and no caprylolactam or pyrrolidone plasticizer is added thereto.

The cast blocks made according to each of the above procedures and stored for 24 hours are subjected to a ball-impact test. In this test a 16-pound bowling ball is dropped 10 times in a 10-minute period from a height of 6.5 feet onto the 10 inches × 10 inches × 3/8 inch block of cast polymer resting on a flat steel base containing a cuplike depression having a diameter of 4½ inches and a depth of 2 inches. The polylactam blocks are centered over the cuplike depression, and the ball is dropped approximately on the center of the test block. The result is that the composition containing the pyrrolidone plasticizer does not fracture whereas the composition without the plasticizer fractures into many pieces.

EXAMPLE 2

The procedure described in Example 1 is repeated, with vessel 1 containing the same ingredients in like amounts, and vessel 2 containing 94 g. of ε-caprolactam, 132 g. of ω-laurolactam, 6 g. of the 1 to 2 molecular addition product of bis(4-isocyanatocyclohexyl)methane and ε-caprolactam as polymerization promoter, and 44 g. of N-methyl-2-pyrrolidone. The polymerizable lactam composition is added to the mold and polymerized at about 150° C. The resulting block of cast plasticized polylactam is subjected to the same ball-impact test described above. The result is that the plasticized polylactam does not fracture.

EXAMPLE 3

A mixture of caprolactam, sodium hydride (0.7 percent) in oil, and potassium stearate is prepared as described in Example 1, but using 1 percent instead of 2 percent of potassium stearate. A second process stream containing caprolactam, laurolactam, Zytel-63 (i.e., a terpolymer of nylon 6, 66 and 6-10) thickening agent, titanium dioxide pigment, N-methyl-2-pyrrolidone, and about 1.2 percent by weight of poly(diphenylolpropane carbonate), i.e., Lexan-105, as polymerization promoter is prepared as described in Example 1. The proportions of ingredients in said second process stream are adjusted in a series of casting runs so that on combination of equal volumes of the first and the respective second streams and passage of the resulting merged stream through an inline mixing device, polymerizable lactam compositions having a range of ingredients as shown in the table below are obtained.

Casting Composition–Wt. %[1]

| NMP[2] | Laurolactam | Service Life No. of Impacts[3] |
|---|---|---|
| 15 | 9 | 2,270+ |
| 18 | 4 | 4,810+ |
| 5 | 8 | 1,800+ |
| 10 | 4 | 16,000+ |
| 10 | 5 | 5,190+ |
| 10 | 8 | 5,190+ |

¹All compositions contain in addition about 2 percent of TiO₂ pigment, and about 4 percent of Zytel-63 nylon resin.

²NMP-N-methyl-2-pyrrolidone

³The + sign indicates testing was terminated arbitrarily and pin was still serviceable.

A set of tenpins was cast from each of the compositions shown in the table, and the tenpins in sets were tested for service life and resistance to impact by employing a standard automatic pin-setting machine that was adjusted to reset all bowling pins after each throw of a 16-pound bowling ball, and a mechanical ball-throwing device which delivered the ball against the set pins at a speed and rate of rotation comparable to that of a ball thrown by a professional bowler. Each throw of the ball and resulting pin fall was recorded as one impact. In order to obtain a comparison of the impact-resistance of the plasticized copolylactam pins with wood pins, a set of American Bowling Congress (ABC)-approved hard maple wood pins was included in the testing, and under the same testing conditions had a service life of only 1,960 impacts.

Data in the table above further demonstrate the high order of impact resistance of plasticized copolylactam compositions of the present invention, and also show the utility of such compositions in giving long service life to articles made of such plasticized copolylactam compositions. Caprolactam compositions with another lactam containing more than six carbon atoms in the ring but having no pyrrolidone plastizicer, as well as caprolactam compositions without another lactam containing more than six carbon atoms in the ring but with N-alkyl pyrrolidone plasticizer, when cast and polymerized give polylactam tenpins that are easily shattered when subjected to impact with a bowling ball, as contrasted to the high impact-resistant plasticized copolylactam articles of this invention.

I claim:

1. An impact-resistant plasticized copolylactam composition containing, by weight, 50 to 90 percent of caprolactam moieties, at least 1 percent of lactam moieties containing seven to 12 carbon atoms in the lactam ring, and 2 to 20 percent of the plasticizer N-alkyl pyrrolidone.

2. A composition of claim 1 wherein the plasticizer is N-methyl pyrrolidone.

3. A composition of claim 2 containing 1 to 15 percent of laurolactam moieties.

4. A composition of claim 2 containing 1 to 15 percent of caprylolactam moieties.

5. A polymerizable lactam composition comprising an anionic catalyst, a polymerization promoter, and containing (a) about from 65 to 90 percent caprolactam, (b) at least 1 percent of a lactam having seven to 12 carbon atoms in the lactam ring, and (c) about from 2 to 20 percent of the plasticizer N-alkyl pyrrolidone.

6. A composition of claim 5 wherein the plasticizer is N-methyl pyrrolidone.

7. A composition of claim 6 containing 1 to 15 percent of ω-laurolactam.

8. A composition of claim 6 containing 1 to 15 percent of ω-caprylolactam.

9. A process for making cast articles of impact-resistant plasticized copolylactam composition which comprises anionically polymerizing in a mold a mixture of lactams below the melting point of the resulting polylactam, said mixture containing an anionic catalyst, a polymerization promoter, and by weight of the total composition, about from 50 to 90 percent caprolactam, and at least 1 percent monomeric lactam having from seven to 12 carbon atoms in the lactam ring, in the presence of 2 to 20 percent of the plasticizer N-alkyl pyrrolidone.

10. A process of claim 9 wherein the plasticizer is N-methyl pyrrolidone.

11. A process of claim 10 wherein the monomeric lactam is laurolactam.

12. A process of claim 10 wherein the monomeric lactam is caprylolactam.

13. A process of claim 11 wherein the amount of laurolactam is from 1 to 15 percent.

14. A process of claim 12 wherein the amount of caprylolactam is from 1 to 15 percent.

* * * * *

PO-1050
(5/69)

UNITED STATES PATENT OFFICE
CERTIFICATE OF CORRECTION

Patent No. 3,644,264          Dated Feb. 22, 1972

Inventor(s) Thomas J. Hyde

It is certified that error appears in the above-identified patent and that said Letters Patent are hereby corrected as shown below:

Claims 1, 5 and 9, last line of each claim, before the period insert --wherein said alkyl group contains 1 to 4 carbon atoms--.

Signed and sealed this 11th day of July 1972.

(SEAL)
Attest:

EDWARD M. FLETCHER, JR.
Attesting Officer

ROBERT GOTTSCHALK
Commissioner of Patents